UNITED STATES PATENT OFFICE.

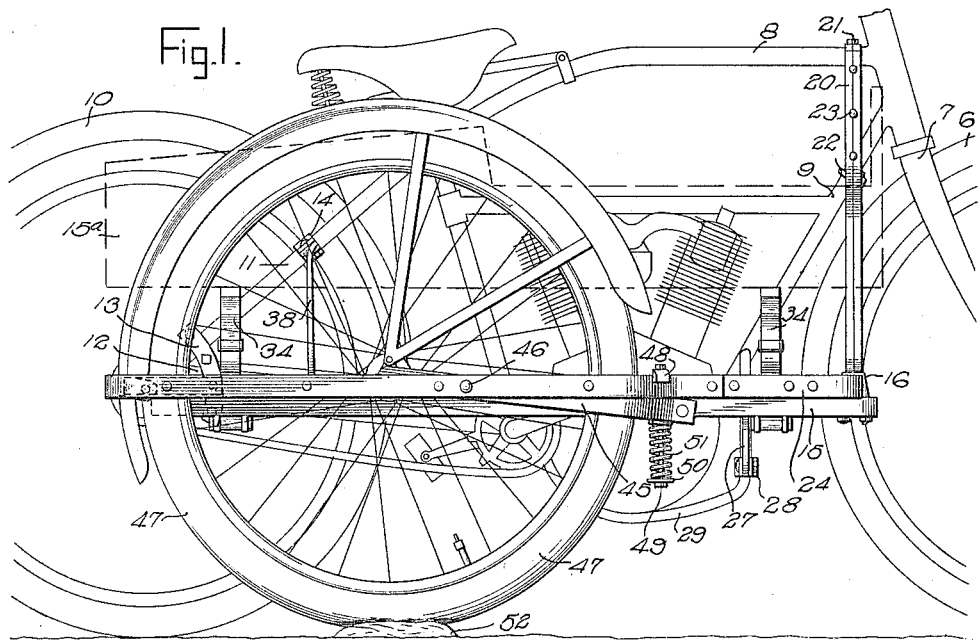

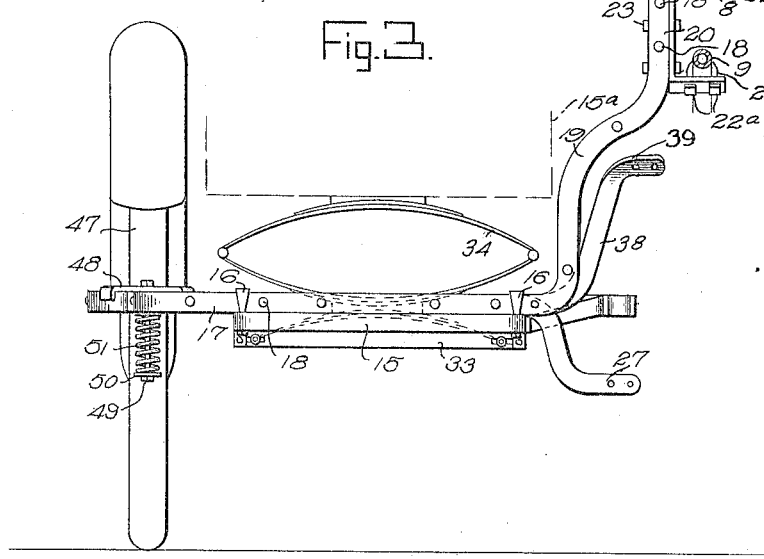

GEORGE MORROW AND MARIE J. R. MORROW, OF CHICAGO, ILLINOIS.

MOTOR-CYCLE CAR.

1,196,137.    Specification of Letters Patent.    Patented Aug. 29, 1916.

Application filed September 4, 1915. Serial No. 49,012.

*To all whom it may concern:*

Be it known that we, GEORGE MORROW and MARIE J. R. MORROW, both citizens of the United States, and residents of Chicago, in the county of Cook and State of Illinois, have invented a new and Improved Motor-Cycle Car, of which the following is a full, clear, and exact description.

Our invention relates to motor cycle cars, that is, to light vehicles to be connected with a motor cycle and disposed alongside thereof, and adapted to carry one or more persons.

Our invention comprehends various parts used for connecting the motor cycle car to the motor cycle in such manner as to secure safety and promote a reasonable amount of flexibility as between the various parts.

Our invention further comprehends the mounting of the road wheel carried by the car in such manner as to enable the device to absorb shocks due to road travel.

Our invention also contemplates various improvements in motor cycle cars and parts associated therewith for the purpose of improving the general efficiency thereof.

Reference is made to the accompanying drawings forming a part of this specification, and in which like letters indicate like parts.

Figure 1 is a side view of our motor cycle car frame, the vehicle body and the rider's seat being removed. Fig. 2 is a plan view of the same; Fig. 3 is an end view of the car as seen by an observer standing at the right of Fig. 2; Fig. 4 is a perspective showing one of the connecting bars used for connecting the car to the motor cycle; Fig. 5 is a perspective showing another of the connecting bars.

The front wheel of a motor cycle is shown at 6, the front fork at 7, and at 8, 9, are the upper and lower bars of the motor cycle frame. The rear wheel of the motor cycle appears at 10, and the rear fork of the machine at 11, this rear fork extending downwardly into engagement with a pair of tubular rods, one of which is shown at 12. These rods constitute braces, thus forming a part of the framework. A connecting plate 13 is secured rigidly upon the rear fork 11 and the adjacent tubular brace 12. A sleeve 14 is fitted upon the rear fork 11 and is used for making one of the connections with the motor cycle car, as hereinafter explained. The car frame is shown at 15 and is of substantially rectangular form. A vehicle body 15ª, shown by dotted lines in Figs. 1 and 3, rests upon the frame 15. A chair or other form of seat may be used in connection with the vehicle body 15ª. At the corners of the rectangular frame 15 are eyes 16. A cross-bar 17 made in this instance of a pair of flat bars connected together by rivets 18, extends across the front end of the frame 15 and through the eyes 16. The cross-bar 17 is provided with an upwardly extending portion 19 and with a portion 20 bent outwardly and upwardly from the portion 19, so as to reach the tubular portions 8 and 9 of the motor cycle frame. Mounted upon the portion 20 is a bracket 21 carrying a pair of U-bolts 22 and nuts 22ª for securing the bracket to the upper and lower bars 8, 9, of the motor cycle frame. Bolts 23 are used for clamping the portion 20 in position relatively to the frame members 8, 9. The cross-bar 17 is provided with portions 24, which are simply continuations of the metallic members constituting the body portion of the cross-bar. These portions 24 are therefore simply flat bars. They are spaced apart by spacing blocks 25. Another cross-bar 26 is provided with a foot 26ª, the latter being secured rigidly to the bar 24. The cross-bar 26 is provided with a downwardly extending portion 27, the latter being bolted to a sleeve 28, which is detachably secured upon braces 29 carried by the motor cycle.

The cross-bar 26 is mounted rigidly upon the frame 15, by aid of fastenings 30. A pair of brace bars 31 are connected with the frame 15 and are held together at their middle portions by a rivet 32. A number of other cross-bars 33 are connected with the frame 15 and extend directly across the same. Carriage springs are shown at 34 and are used for supporting the vehicle body 15ª. A wheel yoke 35 is mounted upon the bars 24 and extends rearwardly therefrom. Connected with the wheel yoke 35 is a cross-bar 36 which extends through the eyes 16 at the rear end of the frame 15. A cross-bar 37 is connected by fastenings 37ª with the frame 15 and is provided with a foot 37ᵇ which is secured rigidly to the adjacent side of the wheel yoke 35. The bar 37 is provided with a portion 38 extending obliquely upward, and terminating in an end portion 39, this end portion being bolted to the sleeve 14 which is mounted upon the rear fork 11.

The cross-bar 36 is provided with a bracket 40 (see Fig. 2) this bracket at its rear end having an eye 41 and being provided at its front end with an eye 42 through which extends a bolt 43. The bracket 40 is disposed adjacent to the hub of the motor cycle and the eyes 41 and 42 are connected respectively with the extreme rear end of the motor cycle frame and with the connecting plate 13, the bolt 43 being used to facilitate this connection. A brace 44 is connected with the frame 15 and with one end of the cross-bar 36.

A wheel fork is shown at 45 and is pivoted upon bolts 46, the latter being carried by the wheel yoke 35. A wheel 47 is carried by the wheel fork 45 and is movable with this wheel fork as the latter swings relatively to the wheel yoke 35. The supporting plate 48 is carried by the wheel yoke 35, and a bolt 49 is carried by the supporting plate 48. This bolt at its lower end carries a washer 50 and engaging this washer and encircling the bolt 49 is a spiral spring 51. This spring is under tension, its upper end engaging and pressing against the adjacent portion of the wheel fork 45. The bolts 46, which form pivots upon which the wheel fork 45 is adapted to swing, are located nearer to the hub of the wheel 47 than they are to the spring 51.

The construction above described affords great strength and holds the car and the motor cycle frame together in a fixed relation, which is very satisfactory in practice. The frame of the motor cycle car is not flexible relatively to the motor cycle frame and there is no side draft present owing to the fact that the wheel 47 is located as far to the front as it is. There being no side draft, a great saving in tires is effected.

As may be understood from Figs. 1 and 2, the wheel 47 may, within reasonable limits, be moved bodily upward relatively to the frame 24, the spring 51 being for this purpose pressed slightly by movement of the adjacent end of the wheel yoke 45 relatively to the frame 15.

As the vehicle travels along the road, if the wheel 47 runs over a cobble-stone 52, or similar obstacle, the wheel 47 may momentarily rise a slight distance without causing the adjacent portion of the frame 15 to rise with sufficient abruptness to cause a shock. The spring 51 and parts adjacent to the same therefore serve the purpose of a shock absorber.

The operation of our device is as follows: The parts being assembled and arranged as shown in Figs. 2 and 3, and the various connections to the motor cycle made, as above described, the vehicle body 15ª is mounted upon the carriage springs 34 and a driver's seat or chair, as desired, is placed upon the vehicle body in order to enable one or more passengers to be seated. The motor cycle now being driven forward in the manner well understood in this art, the motor cycle car is carried along with it.

We have found, from actual trial on the road, that there is no side draft or lateral drag upon the wheel 47 or upon the wheels of the motor cycle. There is therefore no undue strain upon the cars used upon any of the wheels. If the wheel 47 strikes an obstacle or suddenly jumps into a rut, the corresponding movement of the frame is cushioned and the shock is thus very effectively absorbed.

We do not limit ourselves to the precise construction shown, as variations may be made therefrom without departing from the spirit of our invention.

Having thus described our invention, what we claim as new and desire to secure by Letters Patent, is:

1. In a motor cycle car, the combination of a car frame, means for connecting the same to a motor cycle, a wheel yoke connected with the said frame, a wheel fork mounted within said wheel yoke and movable relatively to the same, and a supporting wheel carried by said wheel fork.

2. In a motor cycle car, a car frame, cross-bars secured to said frame, means for connecting said cross-bars to the frame of a motor cycle, a wheel yoke mounted upon said cross-bars and rigid relatively to said vehicle body, bolts carried by said wheel yoke, a wheel fork pivotally mounted upon said bolts and free to rock relatively to said wheel yoke, a wheel journaled upon said wheel fork and adapted to rest upon the ground in order to support the weight of said car frame, and a shock absorber connected with said car frame and with said wheel fork for preventing transmission of shocks from said wheel to said frame.

3. In a motor cycle car, the combination of a car frame, cross-bars connected therewith, a wheel yoke mounted upon said cross-bars, other cross-bars connected with said wheel yoke and with said vehicle frame, means for connecting all of said cross-bars to a motor cycle frame, a wheel fork pivotally connected with said wheel yoke and adapted to rock relatively to the same, a wheel journaled to one end of said wheel fork and arranged to rest upon the ground in order to support the weight of the vehicle frame and wheel yoke, a spring engaging the end of the wheel fork opposite the location of the wheel so that the axis of movement of the wheel fork relatively to the wheel yoke is located between the wheel and the spring, a rod extending through said spring and means for connecting said rod to said frame.

4. The combination with a car frame and means for connecting the same to a motor cycle frame, of a wheel yoke rigid relatively to the car frame, a wheel mounted within said wheel yoke and adapted to support the weight of the car frame and of the wheel yoke, mechanism connecting said wheel with said wheel yoke, and a shock absorber connecting said wheel yoke and said mechanism for cushioning shocks as between said wheel and said wheel yoke.

5. A device of the character described, comprising a car frame, a wheel yoke mounted thereupon, a wheel fork journaled to said wheel yoke, a wheel carried by said wheel fork, and a shock absorber connected with said wheel fork and with said car frame.

6. The combination with a substantially rectangular car frame, a wheel for supporting the same, and a wheel yoke, of cross bars secured rigidly to said car frame, one of said cross bars extending across the frame at the front thereof and having an upwardly extending portion at one end, and means for connecting the said upwardly extending portion with the upper and lower braces of a motor cycle frame, the said cross bar having a rearwardly extending portion at its other end on which the said wheel yoke is mounted.

7. In a motor cycle car the combination of a car frame, a wheel yoke, a cross bar mounted on the front end of the frame, and provided with an upwardly extending portion, a bracket carried by the upwardly extending portion of the cross bar, means mounted upon the bracket for connecting the same to the upper and lower bars of a motor cycle frame, the said cross bar being connected with the wheel yoke, a cross bar at the rear end of the frame and connected at one end with the said wheel yoke, and means for connecting the other end of said rear cross bar with the rear end of the motor cycle frame.

8. The combination with a motor cycle frame, of a car frame connected to one side thereof, a wheel yoke connected with the car frame, a wheel mounted within said wheel yoke, the axis of said wheel being forward of the rear wheel of the motor cycle, and means for preventing transmission of shocks from said wheel to said car frame.

In testimony whereof we have subscribed our names to this specification in the presence of two subscribing witnesses.

GEORGE MORROW.
MARIE J. R. MORROW.

Witnesses:
CHARLES S. TRUSE,
CHAS. C. HATCHER.

Copies of this patent may be obtained for five cents each, by addressing the "Commissioner of Patents, Washington, D. C."